W. S. BAIRD.
CLASP BRAKE RIGGING.
APPLICATION FILED JUNE 23, 1921.
1,432,230.
Patented Oct. 17, 1922.
2 SHEETS—SHEET 1.
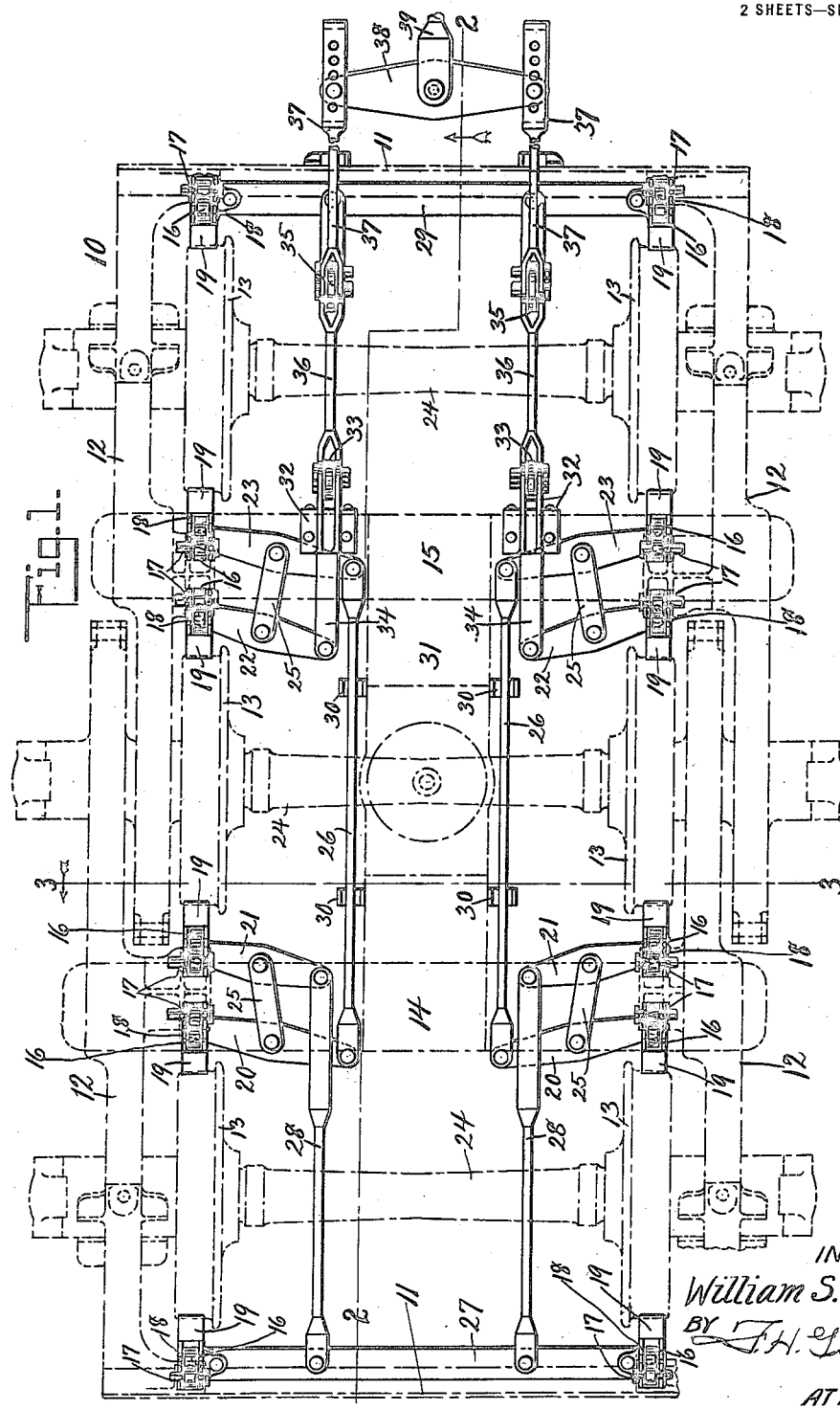
INVENTOR.
William S. Baird
BY T. H. Gibbs
ATTORNEY.

W. S. BAIRD.
CLASP BRAKE RIGGING.
APPLICATION FILED JUNE 23, 1921.
1,432,230.
Patented Oct. 17, 1922.
2 SHEETS—SHEET 2.
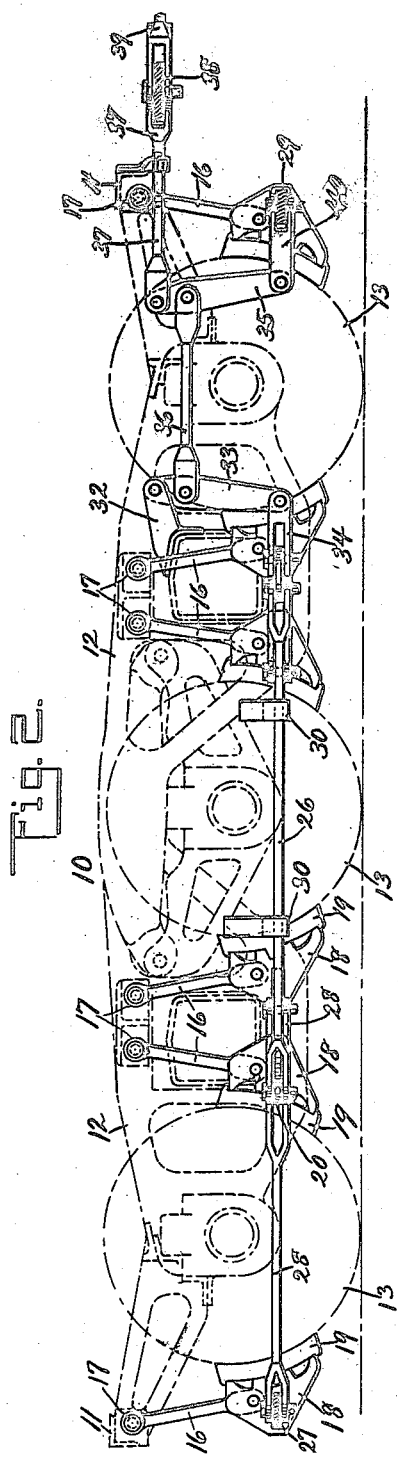
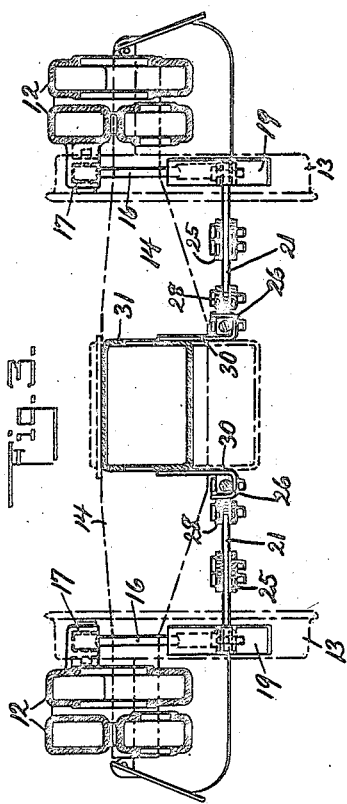
INVENTOR:
William S. Baird
BY F. H. Gibbs
ATTORNEY.

Patented Oct. 17, 1922.

1,432,230

UNITED STATES PATENT OFFICE.

WILLIAM S. BAIRD, OF ELMHURST, NEW YORK, ASSIGNOR TO AMERICAN CAR AND FOUNDRY COMPANY, OF NEW YORK, N. Y., A CORPORATION OF NEW JERSEY.

CLASP BRAKE RIGGING.

Application filed June 23, 1921. Serial No. 479,874.

*To all whom it may concern:*

Be it known that I, WILLIAM S. BAIRD, residing at Elmhurst, in the county of Queens and State of New York, and being a citizen of the United States, have invented certain new and useful Improvements in a Clasp Brake Rigging, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a plan view of my brake arrangement as applied to a 6-wheel freight car truck;

Figure 2 is an elevational view partly in section taken on line 2—2 of Fig. 1, looking in the direction indicated by the arrow; and Figure 3 is a transverse section through the truck taken on line 3—3 of Fig. 1, looking in the direction indicated by the arrow.

My invention relates to that class of brake apparatus in which the braking power is applied to the opposite sides of each wheel of the truck.

One object of my invention is to provide a clasp brake apparatus in which the power from the brake cylinder is transmitted to pairs of connected primary levers arranged on opposite sides of the truck and adjacent one end thereof.

Another object is to transmit the power received by the primary levers to the truck wheels through the medium of brake shoe actuating levers arranged in pairs between the axles only and connected with brake beams at the outer sides of the end pairs of wheels.

A further object is to so connect the brake shoe actuating levers and brake beams that the brake shoe pressure on the brake beam side of the end pairs of wheels will equal the pressure of the shoes on the actuating levers.

In said drawings, 10 designates in broken lines a 6-wheel truck comprising the usual truck frame having the customary end sills 11 and wheel pieces 12 and mounted on three pairs of wheels 13 spaced apart to receive bolsters 14 and 15 supported on the wheel pieces.

The brake parts are suspended from the truck frame by means of hangers 16 pivotally secured to the truck frame as at 17 and supporting at their lower ends the usual brake heads 18 in the plane of the wheels. The brake heads 18 are fitted with brake shoes 19 in position to bear against the truck wheels under the influence of pressure applied by means of brake parts hereinafter to be identified.

Pivotally secured to their respective brake heads 18 are substantially horizontal brake levers 20, 21, 22 and 23, arranged in pairs between the axles 24 and on opposite sides of the truck. Said levers extend inwardly from their respective heads and are connected in pairs at their intermediate portions by short compression links 25. To the inner ends of brake shoe levers, 20 and 23, connections 26 are secured, these connections functioning to transmit power from one pair of levers on one side of the center axle to the pair of levers on the opposite side of said axle.

Brake beams are used only at the ends of the truck and carry brake shoes for engagement with the outer sides of the end pairs of wheels. For equalizing the brake shoe pressure on all wheels of the truck and to insure like uniformity in the pressure of the shoes carried by the brake beams, the beams are connected to the brake levers 21 and 22, carrying the shoes bearing on opposite sides of the middle pair of wheels, brake beam 27 being connected to brake levers 21 by connections 28, and beam 29 to brake levers 22 by other connections hereinafter to be described.

The brake levers 20, 21, 22, and 23, are arranged in substantial parallelism and are initially positioned at an angle to the plane of the truck wheels. To avoid excessive inclination of the levers upon application of the brakes, said levers are inclined toward that end of the truck farthest removed from the brake cylinder (not shown). The brake shoe levers are supported in their horizontal positions through the medium of guides 30 secured to the bridge 31 connecting the bolsters as shown, or in any other approved manner. Riding in and supported by said guides 30 are the floating connections 26 having their ends secured to and supporting the inner ends of brake levers 20 and 23. Connections 28 are carried at one end upon levers 20 and traverse the same for connection with and support of levers 21.

Supported on truck bolster 15 are fulcrum brackets 32 for pivotally carrying primary dead levers 33. Couplings 34 are secured to the lower ends of said levers and supported upon levers 23 beyond which they extend for supporting levers 22. It will be noted that the levers 22 are indirectly supported by connection 26 through the medium of levers 23 supported directly by said connection in substantially the same manner that levers 21 obtain their support from levers 20 as above described.

The primary dead levers 33 are connected to primary live levers 35 by pull rods 36 secured to intermediate portions of said levers. The primary levers are positioned on opposite sides of the truck and connected to the source of power by pull rods 37 secured to the upper ends of the primary live levers 35 and to the ends of the floating equalizing lever 38 connected by power rod 39 to the brake cylinder (not shown).

Secured to the lower ends of live levers 35 are couplings 40 connecting said levers with brake beams 29 at that end of the truck so that in operation, a pull on rods 37 will cause primary live levers 35 to pivot on rods 36 and bring up the shoes on brake beam 29, causing primary dead levers 33 to fulcrum on brackets 32 and exert a pull on couplings 34 secured to the inner ends of brake shoe levers 22. In response to the pull of couplings 34, levers 22 will fulcrum on adjacent links 25 and bring up their shoes against the adjacent side of the middle pair of wheels. The shoes on levers 22 having been brought up as described, a continued pull on couplings 34 will be communicated through levers 22 to the links 25, said links operating under compression to cause adjacent levers 23 to bring up their respective shoes against the inner side of the adjacent end pair of wheels.

Upon actuation of levers 23, rods 26 will be carried in the direction of the forces exerted by the shoes carried on levers 23, causing said rods to transmit such power and movement to the lever 20 on the opposite side of the center axle. Levers 20 are fulcrumed on adjacent links 25 causing said levers to bring up their respective shoes against the inner side of the adjacent end pair of wheels under the influence of power exerted by the movement of rods 26, said links operating under compression to cause levers 21 to move up their shoes against adjacent side of the middle pair of wheels. Upon bringing up of the shoes on levers 21, the continued thrust of adjacent compression links 25 will cause the inner ends of said levers to move in the same direction as their respective shoes and carry along connections 28 to which brake beam 27 is secured, the shoes on said beam bringing up against the outer side of the adjacent end pair of wheels.

It will be noted from the foregoing that the interlacing, respectively, of levers 20 and connections 28 and levers 23 and couplings 34, requires the use of links 25 in compression to permit direct attachment of said connections and coupling to levers 21 and 22 respectively, for equalizing the pressure of the shoes carried by the brake beams.

What I claim is:

1. In a brake-rigging for six-wheeled trucks, the combination with brake shoes applied to opposite sides of each pair of wheels, brake levers extending inwardly from certain of said brake shoes and arranged in pairs between the wheels, and compression links connecting the levers of each pair.

2. In a brake-rigging for six-wheeled trucks, brake shoes applied to opposite sides of each wheel, brake levers extending inwardly from certain of said brake shoes and arranged in pairs between the wheels, compression links connecting said levers in pairs, and connections on the inner ends of certain of said levers adapted to support the other levers of each pair.

3. In a brake-rigging for six-wheeled trucks, brake shoes applied to opposite sides of each wheel, brake levers extending inwardly from certain of said brake shoes and arranged in pairs between the wheels, and connections on the inner ends of certain of said levers adapted to support the other levers of each pair.

4. In a brake-rigging for six-wheeled trucks, the combination with brake shoes applied to opposite sides of each pair of wheels, of brake levers extending inwardly from certain of said brake shoes and arranged in pairs between the wheels, and connections on the inner ends of certain of said levers for supporting all of said levers.

5. In a brake-rigging for six-wheeled trucks having brake beams on the outer sides of the end pairs of wheels only, the combination with brake shoes applied to both sides of each wheel, of brake levers extending inwardly from certain of said shoes and arranged in pairs between said wheels, connections on the inner ends of certain of said levers adapted to support the other levers of each pair, and means connecting said other levers to the brake beams.

6. In a brake-rigging for six-wheeled trucks, the combination with brake shoes applied to opposite sides of each pair of wheels, of brake beams connecting the shoes on the outer sides of the end pairs of wheels, brake levers extending inwardly from other of said brake shoes and arranged in pairs between the wheels, connections on the inner ends of certain of said levers for supporting the same, and means connecting the brake beams to the remaining levers.

7. In a brake-rigging for six-wheeled trucks, the combination with brake shoes applied to opposite sides of each pair of wheels, of brake beams connecting the shoes on the outer sides of the end pairs of wheels, brake levers extending inwardly from other of said brake shoes and arranged in pairs between the wheels, floating connections on the inner ends of certain of said levers for directly supporting the same, and means extending beyond said levers for connecting the remaining levers to the brake beams.

8. In a brake-rigging for six-wheeled trucks, the combination with brake shoes applied to opposite sides of each pair of wheels, of brake beams connecting the shoes on the outer sides of the end pairs of wheels, brake levers extending inwardly from other of said brake shoes and arranged in pairs between the wheels, means connecting certain of said levers to the brake beams, and other connections for directly supporting other of said levers.

9. In a brake-rigging for six-wheeled trucks, the combination with brake shoes applied to opposite sides of each pair of wheels, of brake beams connecting the shoes on the outer sides of the end pairs of wheels, brake levers extending inwardly from other of said brake shoes and arranged in pairs between the wheels, means connecting certain of said levers to the brake beams, other connections for directly supporting other of said levers at their inner ends, and links connecting the levers of each pair.

In witness whereof I have hereunto set my hand in the presence of two witnesses.

WILLIAM S. BAIRD.

Witnesses:
 CHARLES H. EVANS,
 JOHN B. D. THOMPSON.